(12) United States Patent
Yoshikawa et al.

(10) Patent No.: US 7,578,328 B2
(45) Date of Patent: Aug. 25, 2009

(54) HEAVY DUTY TIRE

(75) Inventors: Hideaki Yoshikawa, Kobe (JP); Kiyoto Maruoka, Kobe (JP)

(73) Assignee: Sumitomo Rubber Industries, Ltd., Kobe-Shi, Hyogo-Ken (JP)

( * ) Notice: Subject to any disclaimer, the term of this patent is extended or adjusted under 35 U.S.C. 154(b) by 162 days.

(21) Appl. No.: 11/407,959

(22) Filed: Apr. 21, 2006

(65) Prior Publication Data

US 2006/0249237 A1    Nov. 9, 2006

(30) Foreign Application Priority Data

May 9, 2005    (JP)    ............................. 2005-136394

(51) Int. Cl.
*B60C 15/00*    (2006.01)
*B60C 15/06*    (2006.01)

(52) U.S. Cl. .................. 152/539; 152/541; 152/543; 152/546; 152/547; 152/552; 152/554

(58) Field of Classification Search ................. 152/539, 152/540, 541, 542, 543, 544, 545, 546, 547, 152/552, 554

See application file for complete search history.

(56) References Cited

U.S. PATENT DOCUMENTS

| 3,406,733 | A | * | 10/1968 | Boileau | ...................... 152/542 |
| 4,044,811 | A | * | 8/1977 | Dudek et al. | ................. 152/452 |
| 6,796,346 | B2 | * | 9/2004 | Otsuji et al. | ............. 152/209.1 |

FOREIGN PATENT DOCUMENTS

| JP | 60047703 | * | 3/1985 |
| JP | 60064001 | * | 4/1985 |
| JP | 2001-071718 | A | | 3/2001 |
| JP | 2001-191754 | * | 7/2001 |
| JP | 2002-120522 | * | 4/2002 |
| JP | 2005-53251 | * | 3/2005 |

* cited by examiner

*Primary Examiner*—Justin Fischer
(74) *Attorney, Agent, or Firm*—Birch, Stewart, Kolasch & Birch, LLP

(57) ABSTRACT

A heavy duty tire having an improved durability in bead portions and comprising a carcass ply of steel cords, the end portions of which are turned up around bead cores from the axially inside to the axially outside of the tire, and a core protecting rubber having a complex elastic modulus of 50 to 80 Mpa, at least a part of which is located in a core inside region which is located axially inward of the bead core and is sandwiched between the axially inner surface of the bead core and the steel cords of the turnup portion of the carcass ply.

5 Claims, 8 Drawing Sheets

HEAVY DUTY TIRE

BACKGROUND OF THE INVENTION

The present invention relates to a heavy duty tire comprising bead portions having an improved durability.

FIG. 8 illustrates a sectional view of an example of a bead portion of a conventional heavy duty tire. Such a heavy duty tire includes a carcass ply "b" made of steel cords. The carcass ply "b" includes a toroidal main body portion b1, and turnup portions b2 that continue to the main body portion b1 and are wound along the periphery of bead cores "c". The turnup portions b2 are wound around the bead cores "c" so that their terminal ends b2e are located in the proximity of the radially outer surface of the bead cores "c". Such turnup portions b2 can decrease damages such as cord loosening starting from their terminal ends b2e, since the terminal ends b2e of the turnup portions b2 are disposed in regions that show small distortions even when the tire is running in a loaded condition.

Heavy duty tires are filled with air of extremely high pressure of about 600 to about 800 kPa. As a result, cords of the turnup portions b2 of the carcass ply "b" receives a force F that pulls them toward the main body portion b1 (hereinafter, such force is also simply referred to as "pulling out force"). Such a pulling out force F acts to rotate the bead cores "c" surrounded by the turnup portions b2 in a direction as indicated by the arrow in FIG. 8. This consequently leads to unintended deformation of the sectional shape of the bead cores "c" or lifting deformation of bead toes Bt from seat surface Js of rim J. Such deformations deteriorate the durability of the bead portions and the air-in performance of retread tires. The air-in performance is indicative of the easiness of air-filling operations conducted when a tire is mounted on a rim, and it is largely affected by the shape of the beads. If the air-in performance is poor, air is easy to leak out from a clearance formed between the bead and the rim.

It is an object of the present invention to provide a heavy duty tire wherein the rotation deformation of the bead cores and other deformation caused by filling of air can be repressed over a long period of time to thereby improve the durability of the bead portions.

This and other objects of the present invention will become apparent from the description hereinafter.

SUMMARY OF THE INVENTION

It has now been found that the rotation or deformation of the bead cores can be prevented by disposing a core protecting rubber in a region located axially inward of the bead core and axially outward of the carcass ply.

In accordance with the present invention, there is provided a heavy duty tire comprising a carcass ply which is made of steel cords and has a main body portion that extends from a tread portion to each of bead cores of bead portions through sidewall portions, and turnup portions that extend from the main body portion and are turned up around the bead cores from the axially inside to the axially outside of the tire, wherein each turnup portion is composed of a main portion that is bent along the axially inner surface of the bead core, the radially inner surface of the bead core and the axially outer surface of the bead core, and a sub-portion that extends from the turnup main portion towards the carcass main body portion in the vicinity of the radially outer surface of the bead core; and a core protecting rubber having a complex elastic modulus of 50 to 80 Mpa, at least a part of which is located in a region which is located axially inward of the bead core and is sandwiched between the axially inner surface of the bead core and the steel cords of the main portion of the turnup portion.

It is proposed in JP-A-2001-71718 to dispose a rubber in the region axially inward of the bead core, but the proposal requires that the bead cores have a rectangular section and that the same rubber as the bead apex rubber is used as the rubber to be disposed. That is to say, in order to prevent the carcass cords from being damaged by direct contact with the edge of the bead core having a rectangular cross section, JP-A-2001-71718 proposes to prepare the bead apex so as to insert a part thereof between the carcass cords and the rectangular bead core.

In contrast, in the present invention, a rubber that is harder than a rubber used in the bead apex, i.e., a rubber having a complex elastic modulus of 50 to 80 MPa, is separately prepared from the bead apex rubber and is disposed as a core protecting rubber in the region axially inward of the bead core. A pulling out force is generated in the steel cords of the carcass ply by the filling of internal pressure into the tire. However, the core protecting rubber eases such a pulling out force to repress it from being transmitted to the bead cores. With this arrangement, the rotation or deformation of the bead cores can be suppressed even when air is filled in the tire at a high internal pressure, so the heavy duty tire of the present invention exhibits a high bead durability.

DETAILED DESCRIPTION OF THE INVENTION

An embodiment of the present invention will now be explained on the basis of the drawings.

Figure 1:
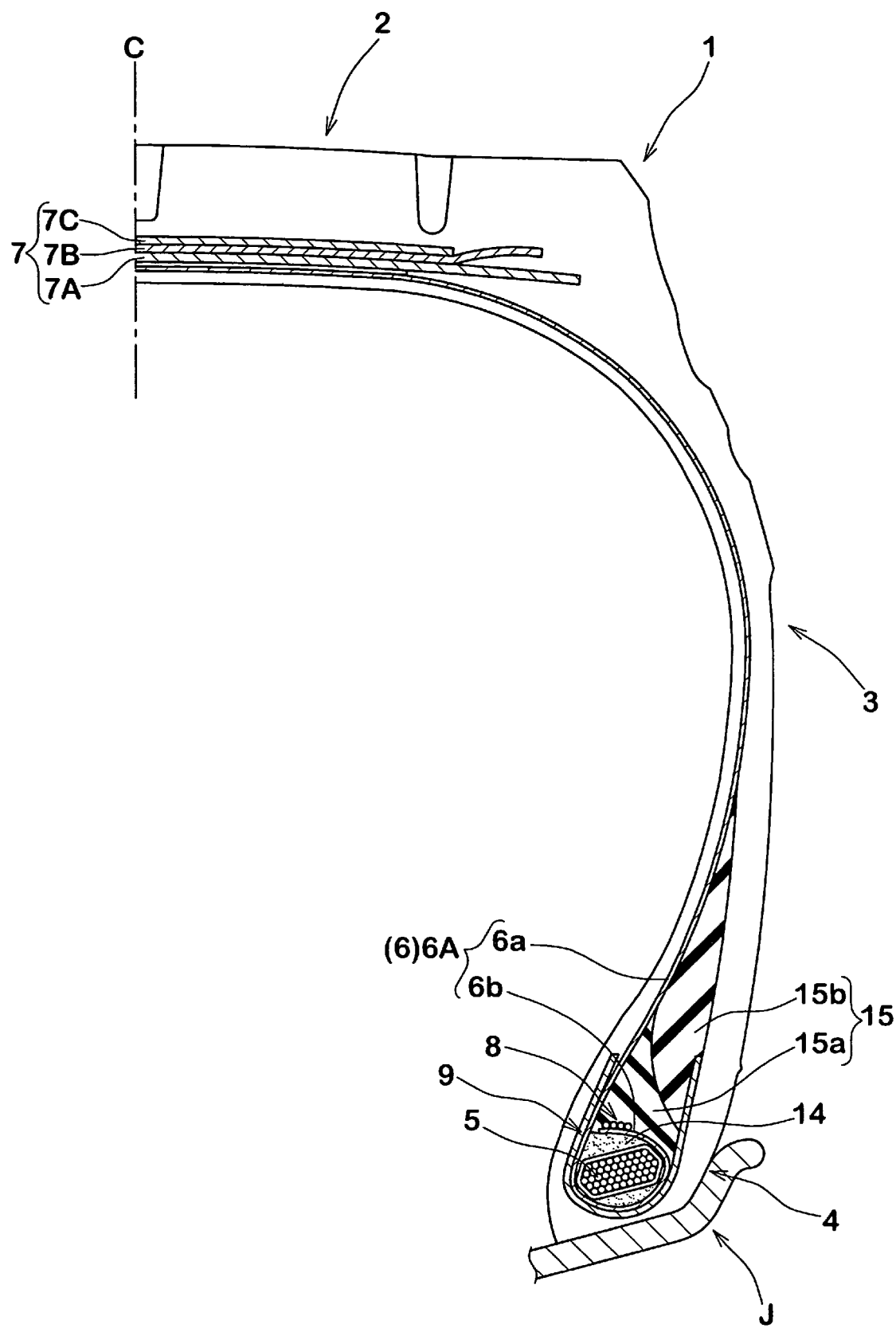
FIG. 1 is a cross sectional view of a right half of a heavy duty tire illustrating an embodiment of the present invention.

FIG. 1 is a cross sectional view illustrating a normal condition of a heavy duty tire 1 of tubeless type according to an embodiment of the present invention, wherein a core protecting rubber is not shown.

The "normal condition" denotes an unloaded condition in which the tire is mounted on a normal rim a and inflated to normal internal pressure. The term "normal rim" denotes a rim defined for every tire in a standardizing system on which the tire is based and, for example, is called "standard rim" in JATMA, "design rim" in TRA and "measuring rim" in ETRTO. The "normal internal pressure" denotes an air pressure that is defined for every tire in a standardizing system, and it is the maximum air pressure in JATMA, the maximum value recited in the table of "Tire Load Limits at various Cold Inflation Pressures" in TRA, and the "inflation pressure" in ETRTO.

The heavy duty tire 1 includes a carcass 6 that extends from a tread portion 2 to each of bead cores 5 in opposing bead portions 4 through sidewall portions 3, a belt layer 7 that is disposed radially outward of the carcass 6 and radially inward of the tread portion 2, and a bead reinforcing layer 9.

Figure 2:
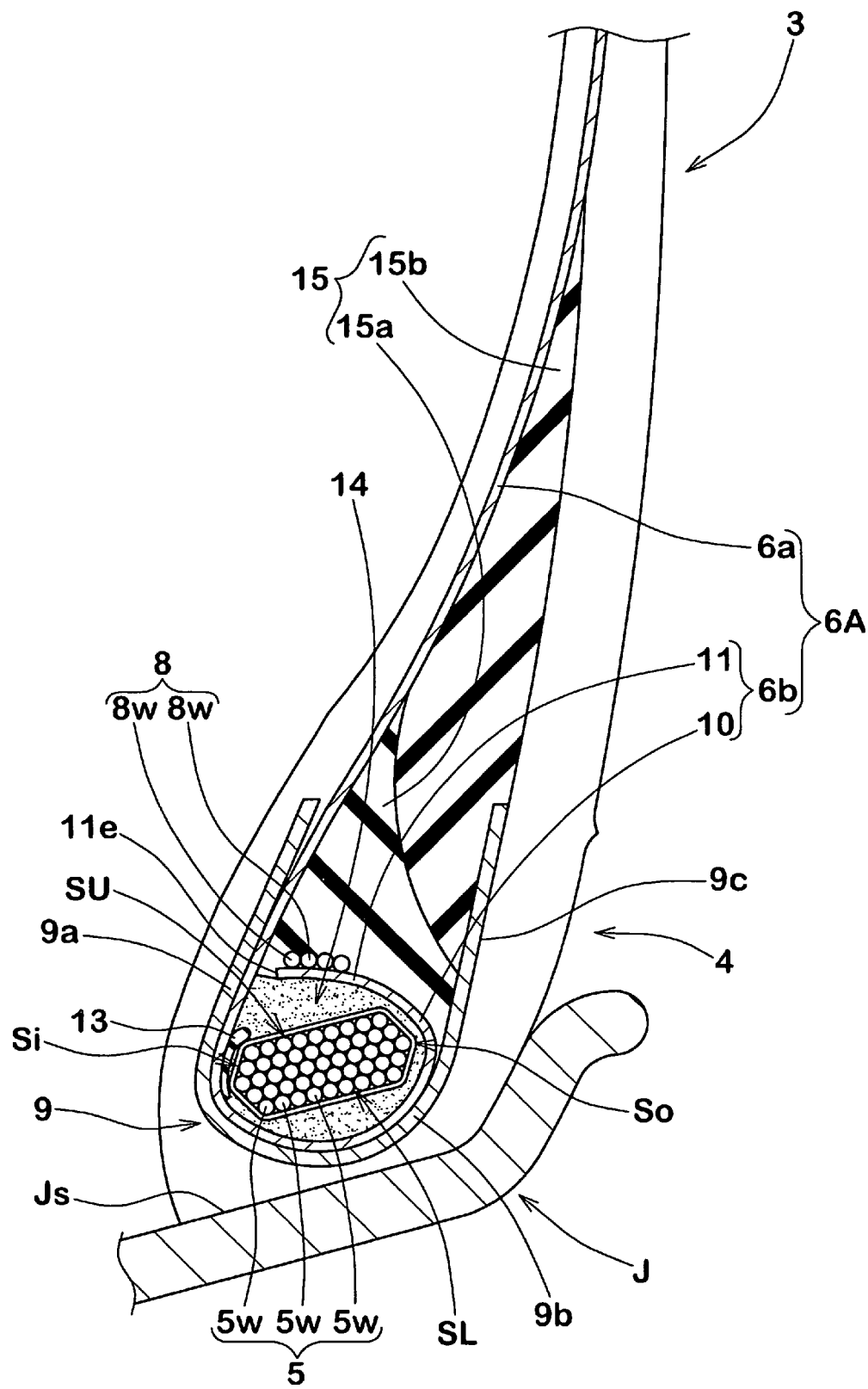
FIG. 2 is a partially enlarged cross sectional view illustrating a bead portion in an enlarged form of the tire shown in FIG. 1.
Figure 3:
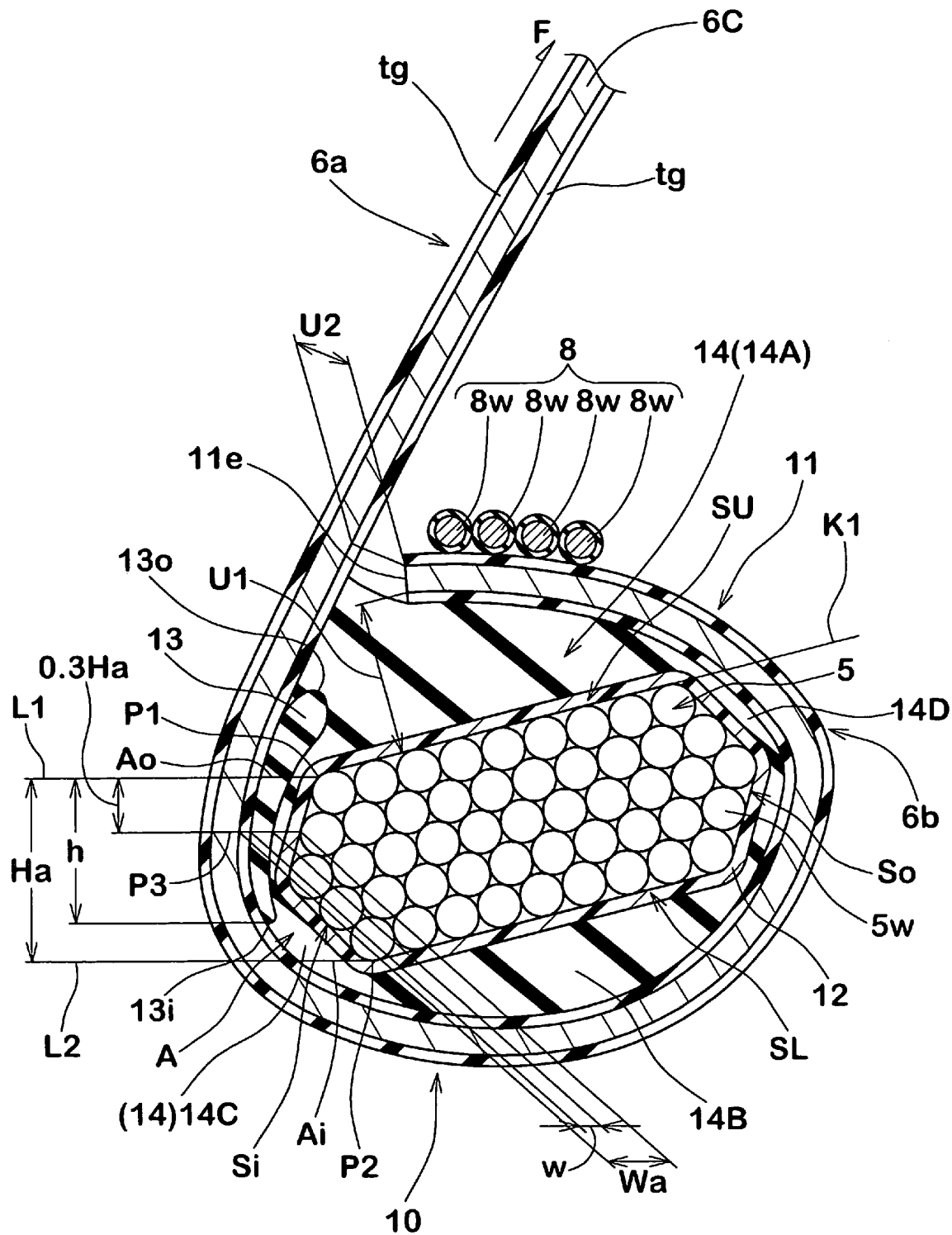
FIG. 3 is an enlarged cross sectional view illustrating the bead portion in a further enlarged form.

The carcass 6 is comprised of at least one carcass ply 6A in which carcass cords 6c are disposed at an angle of, for instance, 80 to 90° with respect to the tire equator C. In this embodiment, the carcass cords are disposed at an angle of about 90°. Steel cords are particularly suitable as the carcass cords 6C. The steel cords may be used in combination with organic fiber cords such as nylon, rayon, polyester and aromatic polyamide. The surface of the carcass cords 6C is covered with topping rubber tg as illustrated in FIG. 3. The carcass cords 6C are aligned and coated with the topping rubber tg to form a carcass ply 6A. Thus, the term "carcass cords 6C" as used herein denotes cords themselves that are not coated with the topping rubber tg. In this embodiment as shown in FIGS. 1 to 3, the carcass 6 is comprised of a single carcass ply 6A, but the present invention is not limited to such a structure and the carcass may be comprised of two or more carcass plies. The structure of the carcass ply 6A will be described later in detail.

In the present embodiment, the bead cores 5 are comprised of a ring body that is formed of steel wires 5w (which are steel wires having a circular section in the present embodiment) that are spirally wound in a multi-seriate manner and wound up in a successive, whorl-like and multi-staged manner.

Further, in the present embodiment, each bead core 5 has a flat substantially hexagonal cross section as shown in FIGS. 1 to 3. In the cross section, the longer side located radially inside of the bead core (downside in FIG. 2) is defined as a lower surface SL of the bead core 5 while the longer side located radially outside of the bead core (upside in FIG. 2) is defined as an upper surface SU. A kinked line-like bent side that joins the lower surface SL and the upper surface SU of the bead core 5 at axially inside is defined as an inner surface Si, and a bent side on the opposite side is defined as an outer surface So. As illustrated in FIG. 2, the lower surface SL and the upper surface SU are usually disposed to be approximately parallel with respect to the bead seat surface Js of the normal rim J.

In the cross section of the bead core 5, the lower surface SL extends approximately parallel to the bead seat surface Js of the normal rim J. This serves to strengthen the fitting force between the bead portion 4 and the bead seat surface Js over a wide range. The rim J is a 15° taper drop center rim for tubeless tires. Accordingly, in the present embodiment, both of the lower surface SL and the upper surface SU of the bead core 5 incline at an angle of approximately 15° with respect to the tire axial direction.

Preferably the cross section of the bead cores 5 is a flat and substantially hexagonal shape as in the present embodiment, but an orthohexagonal shape, a rectangular shape, a circular shape and other shapes are also applicable according to needs. In the cases where the section of the bead cores 5 is circular or the like, so the lower surface SL and the upper surface SU cannot be defined. In such cases, a square or a rectangle which surrounds the bead core 5 and one side of which extends in the tire axial direction or extends along the bead seat of the rim is virtually defined, whereupon the lower surface SL, the upper surface SU, the inner surface Si and the outer surface so are allotted to regions that are partitioned by diagonal lines thereof.

Figure 4:
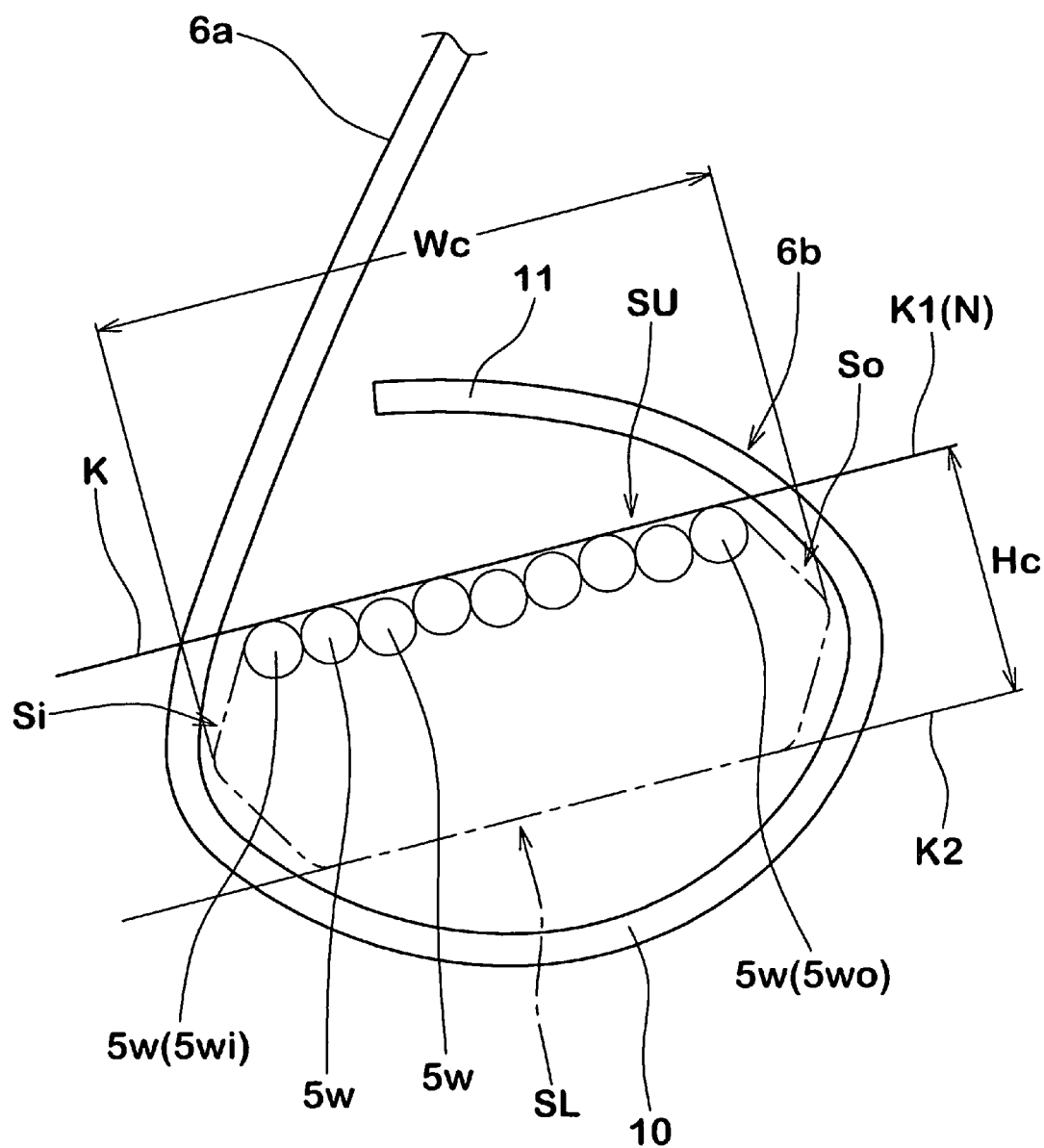
FIG. 4 is an enlarged cross sectional view for explaining the outer peripheral surface of a bead core.

As illustrated in FIG. 4, in the present embodiment, the ratio (Hc/Wc) of a core maximum height Hc to a core maximum width Wc in the cross section of the bead core 5 is preferably not less than 0.43, more preferably not less than 0.45 while its upper limit is not more than 0.58, preferably not more than 0.56, wherein HC is a length between the lines K1 and K2 that contact the upper and lower surfaces SU and SL of the bead core 5. Such bead cores 5 exhibit a high rotation resistance with respect to the pulling out force of the carcass ply. In addition, lifting of the bead toe portions can also be suppressed.

In the present embodiment, a wrapping material 12 is disposed around each of the bead cores 5. The wrapping material 12 is, for instance, organic fibers in the form of a woven cloth, a non-woven cloth or a ply. It is applied to cover the outer surface of the bead core 5. Such a wrapping material 12 exhibits shock-absorbing functions between the steel cords 6C of the carcass ply 6A and the bead wires 5w of the bead cores 5. It also prevents direct contact between the both cords so as to prevent fretting damages.

The belt layer 7 is comprised of at least two plies, and in the present embodiment of three belt plies 7A, 7B and 7C. Each of the belt plies 7A to 7C includes aligned belt cords. The belt cords are comprised of steel cords. In the first belt ply 7A disposed on the innermost side in the tire radial direction, the belt cords are arranged at an angle of, for instance, 60±15° with respect to the tire equator C. The second and third belt plies 7B and 7C are sequentially disposed outside the first ply so that the belt cords are arranged at an angle of, for instance, 10 to 35° with respect to the tire equator C. The second and third belt plies 7B and 7C are stacked so that the belt cords in one ply are crossed, relative to the cords in the other belt ply.

The carcass ply 6A is comprised of a toroidal main body portion 6a that bridges over a pair of bead cores 5, 5 (while only a bead core on one side is illustrated in the drawings) and extends from one bead core 5 to the opposing bead core 5, passing through the crown region of the tire, and turnup portions 6b that extend from the both ends of the main body portion 6a and are turned up around the bead cores 5 from the axially inside to the axially outside of the tire.

As illustrated in FIGS. 2 and 3, each turnup portion 6b is comprised of a main portion 10 that curves along the inner surface Si, lower surface SL and outer surface so of the bead core 5, and a sub-portion 11 that continues from the main portion 10 and extends towards the main body portion 6a at a location near the upper surface SU of the bead core 5. Such an arrangement of the turnup portions 6b is accordingly in the state that the terminal ends 11e of the sub-portions 11 are located in regions where the distortion is small when the tire runs in a loaded condition. It is thus possible to suppress damages that are apt to occur starting from the terminal ends 11e. Since the turnup portions 6b become small, it is also possible to lighten the weight of the tire.

In the present embodiment, the main portion 10 of each turnup portion 6b is bent such that its entire region is smoothly curved in an arc-like fashion. Since the main portion 10 is not bent to form a bent line or a crease, it prevents deterioration in strength of the carcass cords and serves to improve the bead durability.

As illustrated in FIG. 3, the sub-portion 11 denotes a portion that is located radially outward of a tangential line K1 that contacts the upper surface SU of the bead core 5. The terminal end 11e of the sub-portion 11 terminates without contacting the main body portion 6a of the carcass ply 6 to form a clearance U2.

The terminal end 11e is desirably apart from the upper surface SU of the bead core 5 by a distance U1 that is preferably from 3.0 to 8.0 mm. If the distance U1 is less than 3.0 mm, the carcass cords 6C of the sub-portion 11 are more largely bent toward the upper surface SU side, so spring back is apt to occur. Therefore, there is a fear of drawbacks that moldability of green covers is deteriorated and that air remains between the sub-portion 11 and the upper surface SU of the bead core 5 through movement of the sub-portion 11 during vulcanization. On the other hand, if the distance U1 exceeds 8.0 mm, the fastening force of the turnup portions 6b to the bead cores 5 is lowered. As a result, pulling out of the carcass ply 6A and damages starting from the terminal ends 11e of the sub-portions 11 are apt to occur. From this point of view, the distance U1 is preferably not less than 4.0 mm, and is also preferably not more than 7.0 mm. In this respect, the distance U1 is measured not from the outer surface of the wrapping material 12, but from the upper surface SU of the bead core 5.

The bead core 5 in this embodiment is in the shape formed by winding a steel wire or cord 5w having a circular cross-section and, therefore, the cross sectional shape of its upper surface SU has a contour such that semi-arcs of the top portions of the steel cords are jointed in the tire axial direction. In the present invention, the basis for the distance U1 from the upper surface SU of the bead core 5 to the terminal end 11e is the tangential line K drawn on the upper surface SU. Further, as illustrated in FIG. 4, in the case where the steel wires 5w appearing in the cross-section of the bead core vary vertically in height in the tire radial direction, a tangential line N that contacts both the axially outermost bead wire 5wo and the axially innermost bead wire 5wi among the bead wires that appear on the upper surface SU, is regarded as the tangential line K1.

As illustrated in FIG. 3, the terminal end 11e of the sub-portion 11 preferably forms an inter-cord distance U2 of 1 to 5 mm between the terminal end 11e and the steel cords 6C of the main body portion 6a of the carcass ply A. If the distance U2 is less than 1 mm, the terminal end 11e of the sub-portion 11 comes into contact with the carcass cords 6C of the main body portion 6a owing to unavoidable positional shifts at the time of molding the tire or bead deformations depending on running conditions, thus resulting in mutual friction. This is apt to cause cord damages such as fretting. On the other hand, if the distance U2 exceeds 5 mm, the fastening force to the bead cores 5 based on the sub-portions 11 will become insufficient, so the so-called pulling out tends to occur easily.

In the embodiment shown in FIGS. 1 to 3, an auxiliary cord layer 8 for holding each sub-portion 11 of the turnup portion 6b is disposed radially outward of the sub-portion 11. The auxiliary cord layer 8 is formed by spirally winding a cord 8w in the tire circumferential direction. Such an auxiliary cord layer 8 serves to more reliably prevent the spring back of the sub-portion 11 to stabilize its position. For instance, steel cords (including stranded and unstranded wires) are preferably employed as the cord 8w, and organic fiber cords are also sometimes favorably employed.

Figure 5A:
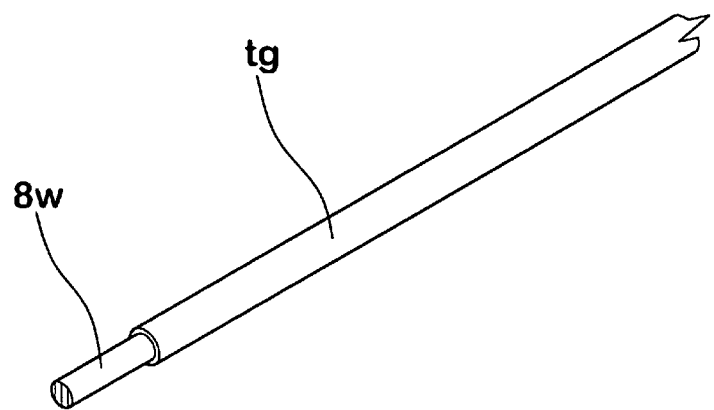
FIG. 5(A) is a perspective view illustrating a steel cord used for an auxiliary cord layer.
Figure 5B:
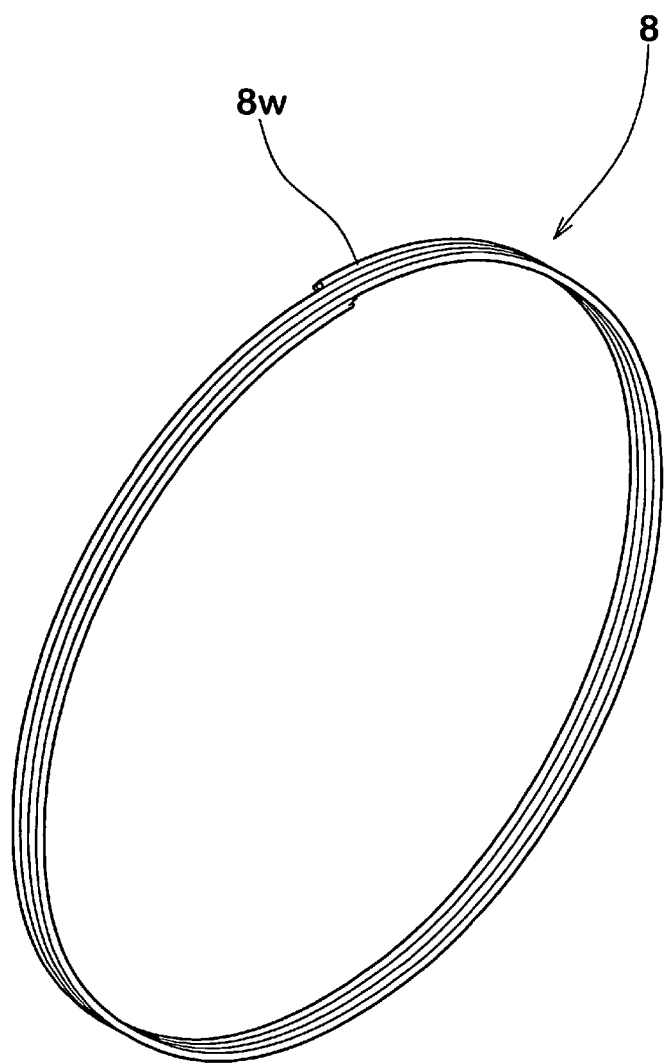
FIG. 5(B) is a perspective view of the entire of the auxiliary cord layer.

A preferable example of the auxiliary cord layer 8 is illustrated in FIGS. 5(A) and 5(B). The auxiliary cord layer 8 is formed by winding a single cord 8w made of steel the surface of which is coated with topping rubber tg, at least one round, preferably several rounds, more preferably about two to eight rounds, around the sub-portion 11 in a spiral manner. Such an auxiliary cord layer 8 is formed as a cord layer of so-called jointless structure including no joints. It can impart a strong hoop effect to the sub-portion 11 that prevents spring back thereof. In general, as a topping rubber tg for the auxiliary cord is used a rubber which is the same as or is harder than the rubber used as a topping rubber for the carcass cords.

A steel cord having a strength of 2,000 to 4,000 N per a cord is suitable as the steel cord used in the auxiliary cord layer 8. If the strength is less than 2,000 N, the number of windings of the cord must be increased for making the auxiliary cord layer 8 exhibit a sufficient hoop effect, so the productivity and dimensional accuracy are deteriorated. On the other hand, if the strength exceeds 4,000 N, the cord 8w becomes excessively hard, so it will become difficult to smoothly wind the cord radially outside of the sub-portion 11 in a spiral manner. A steel cord having a strength of 2,500 to 3,500 N per a cord is more preferred.

Figure 6:
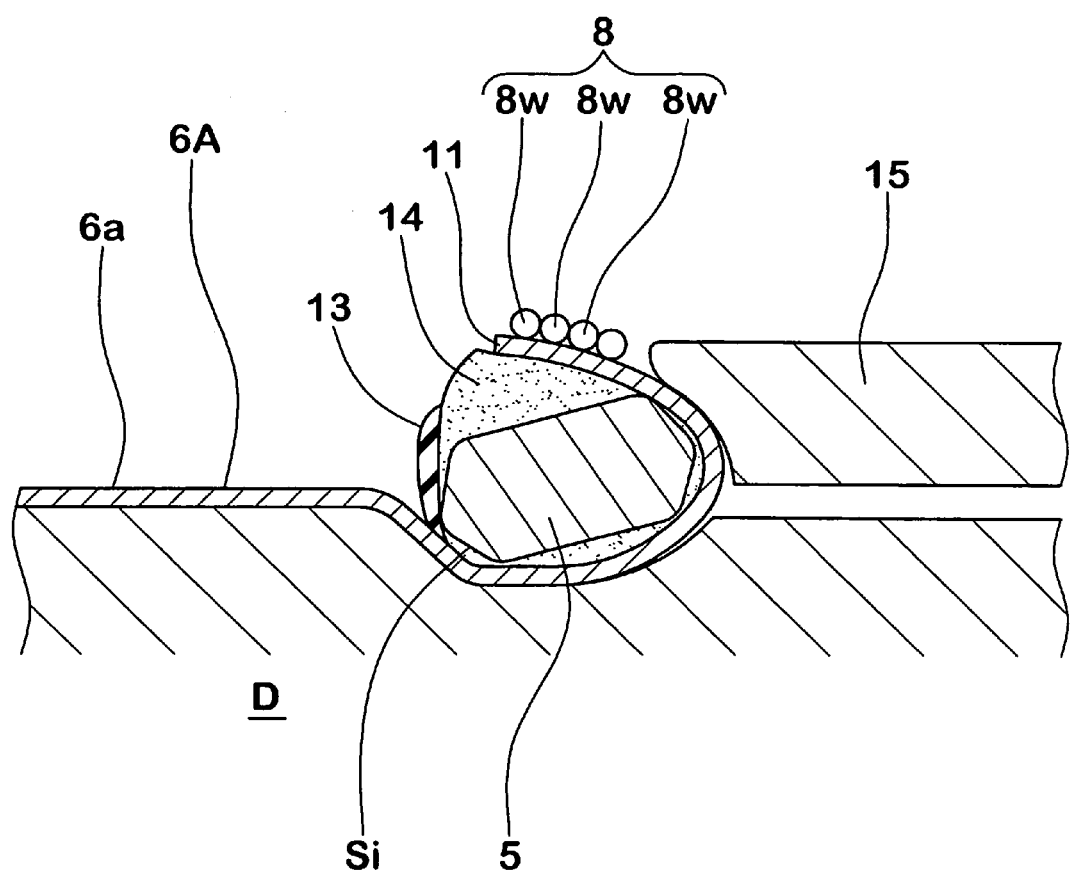
FIG. 6 is a cross sectional view for explaining a method for forming the auxiliary cord layer.

FIG. 6 illustrates an example of a green cover molding step. For instance, both end portions of the carcass ply 6A wound around a molding drum D are made into a folded state as illustrated in FIG. 6 through, for instance, press rings 15 that move from axially outside of the tire. Prior to this, expandable and movable segments that constitute the molding drum D are formed with concave portions for receiving the bead cores 5. With the diameter-expanding movement of the segments, each of the bead cores 5 enters the concave portion. Simultaneously, each of the both end portions of carcass ply 6A is pushed by the bead core 5 to jump up obliquely upwards toward axially outside of the tire. Thus, a substantially elastic bending as illustrated in FIG. 6 is easily achieved through the press ring 15. The auxiliary cord layer 8 is then formed by spirally winding the cord 8w around the outside of the sub-portion 11 of the carcass ply 6A in the state of the sub-portion 11 being bent. After winding of the cord 8w, the outwardly fitting ring 15 is moved in the axially outside direction of the tire to be detached.

As illustrated in FIG. 3, a core protecting rubber 13 having a complex elastic modulus of 50 to 80 MPa is disposed in a region A located axially inward of the bead core 5 (core inside region A) that is sandwiched between the axially inner surface Si of the bead core 5 and the steel cords 6C of the main portion 10 of the turnup portion.

The term "core inside region A" as used herein means a region that is surrounded by a tire axial line L1 that passes through an intersecting point P1 of the inner surface Si and the upper surface SU of the bead core, a tire axial line L2 that passes through an intersecting point P2 of the inner surface Si and the lower surface SL of the bead core, the inner surface Si of the bead core, and the carcass cords 6C of the main portion 10 of the turnup portion 6b. Accordingly, the radially outer end Ao and the radially inner end Ai of the core inside region A are located at positions identical to those of the tire axial lines L1 and L2, respectively. The length of core inside region A in the radial direction of the tire is shown by reference sign Ha. As mentioned above, the term "carcass cords 6C" means bare cords that are not coated with a topping rubber.

The complex elastic modulus is a value obtained by performing measurement of measuring samples with a viscoelasticity spectrometer of model "VES F-3" manufactured by Iwamoto Seisakusho under conditions of measuring temperature 70° C., frequency 10 Hz, initial elongational strain 10% and half amplitude 1%.

When heavy duty tire 1 is mounted on rim J and filled with air of high pressure, a pulling out force F generates at the carcass cords 6C as stated above. In general, in case of a heavy duty tire 1 having a carcass ply structure as shown in the present embodiment, the pulling out force F is easy to directly act on the axially inner surface Si of the bead core 5. As a result, the inner surfaces Si of the bead core 5 is strongly pushed in the axially outward direction by the carcass cords 6C of the main portion 10. This portion is further subjected to a large shear force. Through these forces, the steel wires 5w, 5w (seen in cross section) densely arranged to form a bead core 5 will slip therein to deform the cross sectional shape of the bead cores 5 or to rotate it.

For this reason, in the present invention, the core protecting rubber 13 is disposed in the core inside region A as mentioned above so that at least a part of the core protecting member 13 is located in the region A. The core protecting rubber 13 serves to ease the pulling out force that is produced by filling of air into the heavy duty tire, thus suppressing the movement of the respective wires 5w of the bead core 5. With this arrangement, rotation and deformation of the bead core 5 and deformation of the bead toe portion are prevented upon filling of air of high pressure so as to improve the durability of the bead portions 4.

If the complex elastic modulus E* of the core protecting rubber 13 is less than 50 MPa, the pulling out force cannot be sufficiently relaxed since the rubber is too soft. On the other hand, if it exceeds 80 MPa, the rubber is very hard, so the molding accuracy for the bead portions is deteriorated when molding a green cover for a tire. This consequently deteriorates the durability of the bead portion 4. From such points of view, the complex elastic modulus E* of the core protecting rubber 13 is preferably not less than 52 Mpa, more preferably not less than 54 MPa. The upper limit thereof is preferably not more than 75 Mpa, more preferably not more than 70 MPa.

The core protecting rubber is harder than a rubber of a bead apex that is disposed radially outward of the turnup end portion of the carcass ply. The core protecting rubber is prepared, for instance, from rubber compositions comprising a diene rubber, a vulcanizing agent such as sulfur, a vulcanizing accelerator and other usual additives, to which a thermosetting resin is further incorporated. The complex elastic modulus E* can be freely adjusted by, for instance, changing the amount and/or kind of a thermosetting resin (such as phenol resin or the like) to be incorporated into a rubber composition.

The core protecting rubber 13 in the present embodiment is arranged so that its radially outer end 13o is located at a radially more outer position than the radially outer end Ao of the core inside region A. Further, the radially inner end 13i of the core protecting rubber 13 is located within the core inside region A. The thickness of core protecting rubber 13 gradually increases from the radially inner end 13i toward the radially outer end 13o. The core protecting rubber 13 of such a structure effectively protects the radially outward portion (upper portion in the drawings) of the axially inner surface Si of the bead core 5 at which the pulling out force becomes particularly large, and it serves to suppress the deformation or the like of the bead cores. In the molding step of tire green cover, the core protecting rubber 13 may be previously assembled in the vicinity of the axially inner surface Si of the bead core 5 and vulcanized thereafter as illustrated in FIG. 6, or the core protecting rubber 13 may be previously pre-cured into a suitable shape, whereupon it may be disposed into the tire green cover. Like this, the manufacturing method thereof is not particularly limited.

The core protecting rubber 13 is arranged, as shown in FIG. 3, so that it extends in the radially inward direction at a length h measured from the radially outer end Ao of the core inside region A that is at least 60%, preferably at least 70%, of the length Ha in the tire radial direction of the core inside region A. In other words, the distance h from the tire axial line L1 to the radially inner end 13i of the protecting rubber 13 is at least 60%, preferably at least 70%, of the length Ha between the tire axial lines L1 and L2. If the length h of the core protecting rubber 13 is less than 60% of the length Ha of the core inside region A in the radial direction of the tire, there is a tendency that shear force cannot be sufficiently eased. The upper limit of the height h is not particularly limited. In other words, it is possible to dispose the core protecting rubber 13 over the entire range of the core inside region A.

While the core protecting rubber 13 may be disposed over the entire core inside region A, the carcass cords 6C comes into direct contact with the core protecting rubber 13 having a high complex elastic modulus if topping rubber tg is released from the main portion 10 of the turnup portion during the manufacturing. If a topping rubber tg having a good adhesive property is not disposed around the carcass cords 6C, cord loosening is apt to occur. On the other hand, if the amount of the core protecting rubber 13 to be disposed is too small, the effect of suppressing rotation deformation and the like of the bead cores 5 is apt to be decreased.

In this connection, it has been found by the inventors that within the core inside region A, the largest force acts on a position P3 located from the line L1 at a height of 30% of the length Ha (0.3Ha) in the tire radial direction of the core inside region A, i.e., length Ha in the radial direction of the tire from the radially outer end Ao of the core inside region A to the radially inner end Ai of the core inside region A. It is desirable to optimize the thickness balance between the core protecting rubber 13 and other rubbers particularly at this position P3. It has been found that with this arrangement, not only deformation of the bead core 5 resulting from the pulling out force but also cord loosening of the carcass cords of the main portion 10 can be effectively suppressed. In the present embodiment, the position P3 approximately corresponds to the center position of steel wires located one step upward than a row of steel wires located centrally in the height direction of the bead core 5 (namely the center position of wires located at one step higher row than the widest row of wires of the bead core in the axial direction of the tire).

It is desirable to set the width w of the core protecting rubber 13 at 20 to 80% of the width Wa of the core inside region A in the tire axial direction at the position P3. If the width w of the core protecting rubber 13 at the position P3 is less than 20% of the width Wa of the core inside region A between the carcass cord 6C and the axially inner surface Si of the bead core, the volume of the core protecting rubber 13 will become too small, so there is the tendency that deformation of the bead core 5 cannot be effectively prevented. On the other hand, if the width w of the core protecting rubber 13 exceeds 80% of the width Wa of the core inside region A, a sufficient amount of the topping rubber tg cannot be disposed on the carcass cords 6C, so the cord loosening is apt to occur. In particular, the width w of the core protecting rubber 13 is preferably not less than 30%, more preferably not less than 40%, of the width Wa of the core inside region A at position P3. The upper limit of the width w is preferably not more than 75%, more preferably not more than 70%, of the width Wa.

In the core inside region A, a region made of a rubber other than the core protecting rubber 13 may be provided radially inside or outside of the core protecting rubber 13. In the present embodiment shown in FIG. 3, a topping rubber tg is disposed axially inside of the core protecting rubber 13 and a filling rubber 14 is further disposed axially outside of the core protecting rubber 13.

As the topping rubber tg used for the carcass cords 6C is suitable a rubber material that is soft and has a good adhesive property to the steel cords, preferably a rubber material containing natural rubber. Further, it is preferable that the complex elastic modulus of the topping rubber tg is not more than 20 MPa, especially about 4 to about 11 MPa.

Further, in the present embodiment, the filling rubber 14 is arranged successively in an annular fashion around the bead core 5 between the bead core 5 and the turnup portion 6b of the carcass ply surrounding the bead core. Accordingly, the filling rubber 14 includes a first portion 14A having an approximately triangular cross section that is located between the upper surface SU of the bead core 5, the sub-portion 11 of the turnup portion 6b of the carcass ply and the main body portion 6a of the carcass ply; a second portion 14B having an approximately crescent cross section that is located between the lower surface SL of the bead core 5 and the main portion 10 of the turnup portion 6b; a third portion 14C that joints the first portion 14A and the second portion 14B on the axially inner surface Si side of the bead core 5; and a fourth portion 14D that joints the first portion 14A and the second portion 14B on the axially outer surface So side of the bead core 5. That is to say, in the present embodiment, the third portion 14C of the filling rubber 14 is disposed between the core protecting rubber 13 and the bead core 5.

The filling rubber 14 is made of a relatively soft rubber composition having an excellent effect of relaxing shock or stress. Preferably the complex elastic modulus of the filling rubber 14 is set to be smaller than that of the core protecting rubber 13 but larger than that of the topping rubber tg, whereby the third portion 14C of the filling rubber 14 serves, in cooperation with the core protecting rubber 13, to absorb and ease the pulling out force which acts from the carcass cords onto the bead core 5. The first portion 14A of the filling rubber 14 effectively absorbs distortion which generates during running and acts on the terminal end 11e of the sub-portion 11, so it serves to prevent occurrence of cord loosening.

It is preferable that the filling rubber 14 has a complex elastic modulus E*a of 5 to 50 MPa. If the complex elastic modulus E*a of the filling rubber 14 is less than 5 MPa, the rubber is excessively soft, so the performance of protecting the bead core 5 is lowered. Further, distortion of the terminal end 11e of the sub-portion 11 tends to increase at the time of running. On the other hand, if the complex elastic modulus E*a exceeds 50 MPa, the softness of the filling rubber 14 is impaired. Accordingly, the performance that the entire upper surface SU of the bead core receives and eases a distortion which is caused by falling down of the main body portion 6a of the carcass ply at the time of running, is lowered. From such a point of view, it is desirable to set the complex elastic modulus E*a of the filling rubber 14 at least 6 MPa, preferably at least 7 MPa, more preferably at least 8 Mpa, and to set at most 40 MPa, preferably at most 30 MPa.

Further, as illustrated in FIG. 2, a bead apex rubber 15 that extends radially outwardly in a tapered manner is disposed radially outward of the filling rubber 14 through the sub-portion 11 of the turnup portion 6b. The bead apex rubber 15 in the present embodiment includes an inner apex portion 15a disposed radially inside and an outer apex portion 15b disposed radially outside of the inner apex portion 15a.

The inner apex portion 15a is disposed substantially radially outside of the filling rubber 14 through the sub-portion 11 of the turnup portion. The inner apex portion 15a is in contact with the filling rubber 14 at a part thereof, namely at a location between the terminal end 11e of sub-portion 11 and the main body portion 6a of the carcass ply. A rubber composition having a complex elastic modulus E*b of 20 to 70 MPa is suitable for use as the inner apex portion 15a. The inner apex portion 15a serves to press down the sub-portion 11 of the carcass ply 6A. It can also receive, at the upper surface SU of the bead core 5a, a distortion that is caused by falling down of the main body portion 6a of the carcass ply at the time of running in a loaded condition.

If the complex elastic modulus E*b of the inner bead apex portion 15a is less than 20 MPa, the inner bead apex portion 15a is apt to lack the performance of pressing down the terminal end 11e of the sub-portion 11. On the other hand, if the complex elastic modulus E*b exceeds 70 MPa, the elasticity of this portion is excessively high. As a result, there is a possibility that the distortion will be focused in proximity of the terminal end of the axially outer portion 9c of bead reinforcing layer 9 to damage it. From such a point of view, it is preferable that the complex elastic modulus E*b of the inner apex portion 15a is at least 25 MPa, especially at least 30 Mpa, and is at most 65 Mpa, especially at most 60 Mpa.

The outer apex portion 15b is comprised of a rubber composition having a complex elastic modulus E*c that is smaller than the complex elastic modulus E*b of the inner apex portion 15a. It is preferable that the complex elastic modulus E*c is not less than 3 MPa, especially not less than 3.5 MPa. As for the upper limit thereof, it is preferable that the complex elastic modulus E*c is not more than 7 Mpa, especially not more than 5 MPa. If the complex elastic modulus E*c is less than 3 MPa, the difference in elastic modulus from the complex elastic modulus E*b of the inner apex portion 15a becomes too large, so damages are apt to occur from the vicinity of the interface between the both members. On the other hand, if the complex elastic modulus E*c exceeds 7 MPa, the rigidity of the entire bead portion 4 becomes too high, so there is an undesirable tendency that damages are apt to occur in the vicinity of the terminal end of the outer apex portion 15b.

The heavy duty tire 1 of the present embodiment is provided with a bead reinforcing layer 9 in the bead portion 4. The bead reinforcing layer 9 comprises at least one ply of steel cords (one ply in the present embodiment as shown in FIG. 2) in which, for instance, steel cords are arranged in an inclined fashion at an angle of 10 to 40° with respect to a tire circumferential line. The bead reinforcing layer 9 has an approximately U-shape in cross section and includes an inner portion 9a that radially extends at the axially inside of the main body portion 6a of the carcass ply 6A, an intermediate portion 9b that connects to the inner portion 9a and extends along the main portion 10 of the turnup portion of the carcass ply, and an outer portion 9c that connects to the intermediate portion 9b and radially outwardly extends. Such a bead reinforcing layer 9 suppresses the main body portion 6a of the carcass ply 6A from largely falling down in the axially outward direction when a load is applied to a tire, thus reducing distortion which acts on the terminal end 11e of the turnup portion of the carcass ply. It is also possible to effectively prevent heat of, for instance, the brake pad of a vehicle from being transmitted to rubbers near the turnup portion 6 through the rim.

While a preferable embodiment of the present invention has been described with reference to drawings, it goes without saying that the present invention is not limited to only such an embodiment and various changes and modifications may be made.

The present invention is more specifically described and explained by means of examples and comparative examples. It is to be understood that the present invention is not limited to these examples.

EXAMPLES 1 TO 14 AND COMPARATIVE EXAMPLES 1 TO 6

Figure 7:
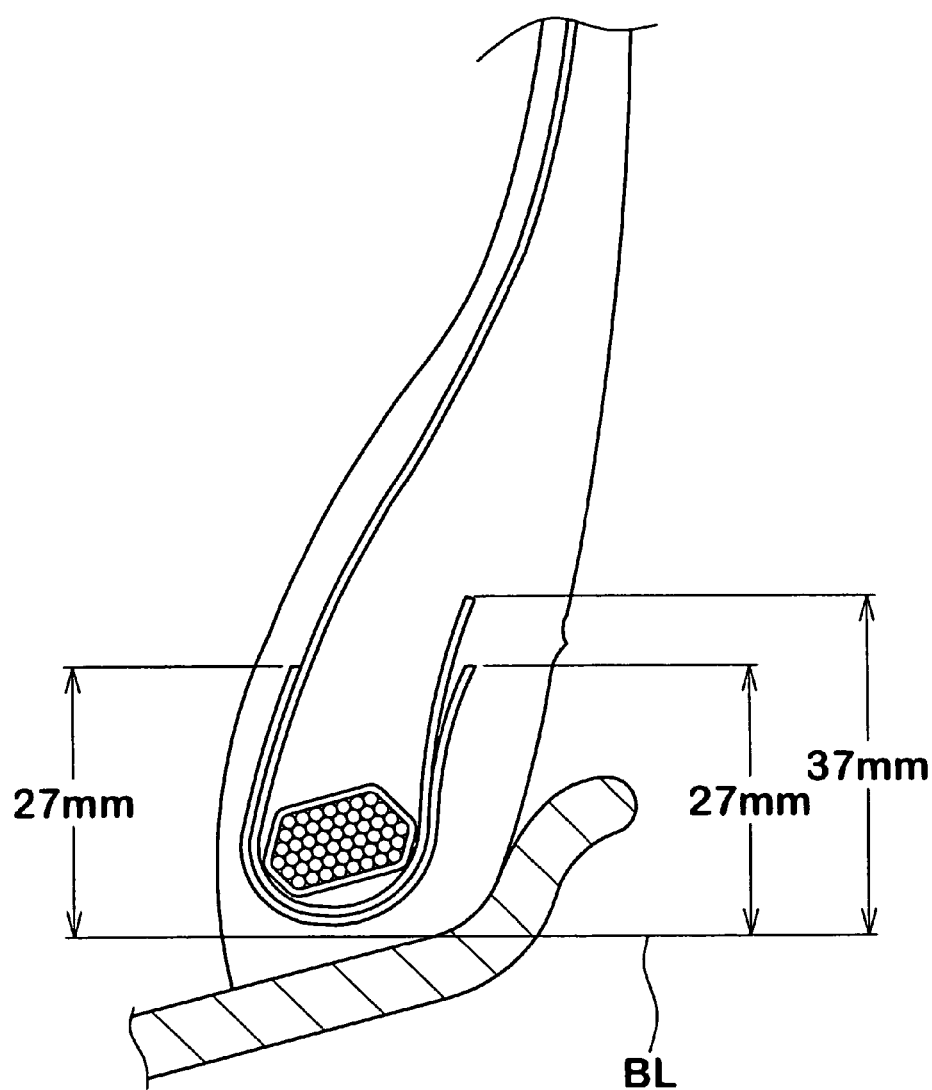
FIG. 7 is across-sectional view illustrating a bead portion in comparative example 1 described after.

Heavy duty tires (size: 11R22.5) having the basic structure shown in FIG. 1 were manufactured based on the specifications shown in Tables 1 and 2, and the performances described below were tested for each of the tires. The same tests were performed with respect to tires which were not based on the present invention (Comparative Examples 1 to 6)

to compare the performances thereof. Specifications of tires which are not described in the tables are common to all tires. The tire of comparative Example 1 had the bead shape shown in FIG. 7. All tires were manufactured to have a bead reinforcing layer wherein the heights of the inner portion 9a and the outer portion 9c from bead base line BL each was 27 mm.

The core protecting rubber was prepared from any one of rubber compositions shown in Table 1.

The testing methods are as follows.

<Air-In Performance>

Each tire was mounted on a rim (size: 7.50×22.5), inflated to an internal pressure of 700 kPa and allowed to stand for 72 hours in an environment of 80° C., whereupon the tire was detached from the rim. Easiness of air filling operations (whether air leakage is little) when each tire was mounted again onto the rim and filled with air was evaluated through senses of an operator. Further, after mounting the tire on the rim, air of 700 kPa was filled in the tire, and the cross sectional image of the tire was obtained by a X-ray CT scanner to measure or confirm the amount of lifting of the bead toe portion from the rim seat surface and the presence or absence of deformation of the bead core. As to the evaluation of the amount of lifting, the reciprocals of respective values were used in the evaluation and indices of the reciprocals to that of Comparative Example 1 regarded as 100 were shown as the amount of lifting. The larger the value is, the better.

<Durability of Bead>

A drum tester was employed. Each tire was mounted on a rim (size: 7.50×22.5), filled with air to an internal pressure of 700 kPa, and run on the testing drum at a velocity of 20 km/h under longitudinal loading (thrice 27.25 kN). The running time up to generation of damages at the bead portions were measured. The durability is shown in Table 2 as an index of the running time based on the running time of comparative Example 1 regarded as 100. The larger the value, the better the durability of bead.

<Durability to Heat>

The test was made in the same manner as the drum durability test mentioned above except that the rim was heated up to 130° C. prior to testing. The durability of bead to heat is shown in Table 2 as an index of the running time based on the running time of Comparative Example 1 regarded as 100. The larger the value, the better the durability to heat.

Test results are shown in Table 2.

TABLE 1

| | | Rubber Compositions | | | | | | | |
|---|---|---|---|---|---|---|---|---|---|
| | | A | B | C | D | E | F | G | H |
| Ingredients of Composition (parts by weight) | Natural Rubber (NR) | | | | | 100.0 | | | |
| | Carbon Black (N220) | | | | | 70.0 | | | |
| | Sulfur | | | | | 2.0 | | | |
| | Vulcanization Accelerator Ns | | | | | 2.0 | | | |
| | Vulcanization Aid HMT | | | | | 1.0 | | | |
| | Phenol Resin | 5 | 10 | 12 | 15 | 18 | 23 | 30 | 35 |
| Complex Elastic Modulus (MPa) | | 15 | 30 | 40 | 50 | 55 | 69 | 80 | 90 |

TABLE 2

Figure 8:
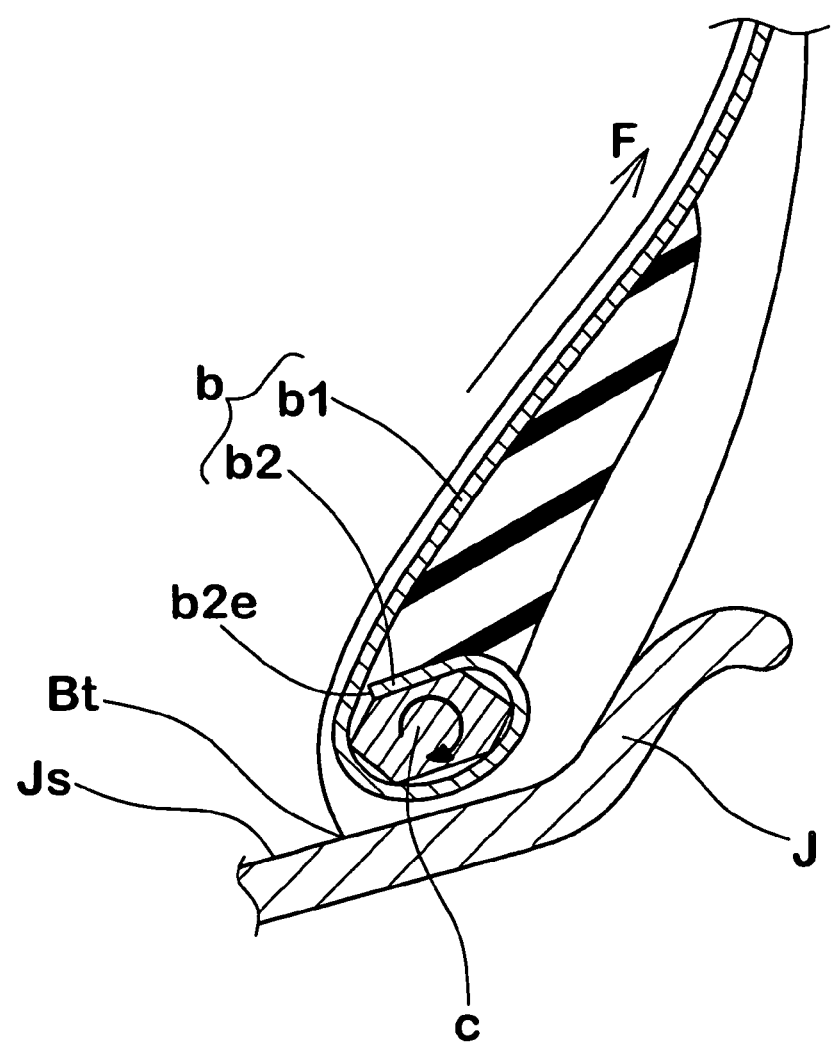
FIG. 8 is a cross sectional view illustrating a conventional bead portion.

| | Com. Ex. 1 | Com. Ex. 2 | Com. Ex. 3 | Com. Ex. 4 | Com. Ex. 5 | Ex. 1 | Ex. 2 | Ex. 3 | Ex. 4 | Com. Ex. 6 |
|---|---|---|---|---|---|---|---|---|---|---|
| Structure of Carcass Ply | FIG. 8 | FIG. 2 | FIG. 2 | FIG. 2 | FIG. 2 | FIG. 2 | FIG. 2 | FIG. 2 | FIG. 2 | FIG. 2 |
| Hc/Wc Ratio of Bead Core | 0.60 | 0.45 | 0.45 | 0.45 | 0.45 | 0.45 | 0.45 | 0.45 | 0.45 | 0.45 |
| Complex Elastic Modulus of Core Protecting Rubber (MPa) (Core Inside Region) | 5* | 5* | 15 | 30 | 40 | 50 | 55 | 80 | 69 | 90 |
| h/Ha Ratio | — | — | 0.9 | 0.9 | 0.9 | 0.9 | 0.9 | 0.9 | 0.9 | 0.9 |
| w/Wa Ratio | — | — | 0.5 | 0.5 | 0.5 | 0.5 | 0.5 | 0.5 | 0.5 | 0.5 |
| Distance U1 (mm) | — | 3.5 | 3.8 | 3.8 | 3.8 | 3.8 | 3.8 | 3.8 | 3.8 | 3.8 |
| Distance U2 (mm) | — | 2.0 | 2.1 | 2.1 | 2.1 | 2.1 | 2.1 | 2.1 | 2.1 | 2.1 |
| Test Results | | | | | | | | | | |
| Air-in Performance | Good | Poor | Poor | Poor | Slightly poor | Good | Good | Good | Good | Good |
| Amount of Lifting of Bead Toe (index) | 100 | 70 | 70 | 80 | 95 | 110 | 110 | 110 | 110 | 110 |
| Deformation of Bead Core | Good | Deformed | Deformed | Deformed | Slightly deformed | Good | Good | Good | Good | Good |
| Durability of Bead (index) | 100 | 130 | 130 | 130 | 130 | 130 | 130 | 120 | 130 | 60 |
| Durability to Heat (index) | 100 | 110 | 110 | 110 | 110 | 115 | 115 | 110 | 115 | 50 |

| | Ex. 5 | Ex. 6 | Ex. 7 | Ex. 8 | Ex. 9 | Ex. 10 | Ex. 11 | Ex. 12 | Ex. 13 | Ex. 14 |
|---|---|---|---|---|---|---|---|---|---|---|
| Structure of Carcass Ply | FIG. 2 | FIG. 2 | FIG. 2 | FIG. 2 | FIG. 2 | FIG. 2 | FIG. 2 | FIG. 2 | FIG. 2 | FIG. 2 |
| Hc/Wc Ratio of Bead Core | 0.45 | 0.45 | 0.45 | 0.45 | 0.45 | 0.45 | 0.60 | 0.55 | 0.50 | 0.42 |
| Complex Elastic Modulus of Core Protecting Rubber (MPa) (Core Inside Region) | 55 | 55 | 55 | 55 | 55 | 55 | 55 | 55 | 55 | 55 |
| h/Ha Ratio | 0.6 | 0.7 | 1.0 | 0.9 | 0.9 | 0.9 | 0.9 | 0.9 | 0.9 | 0.9 |
| w/Wa Ratio | 0.5 | 0.5 | 0.5 | 0.2 | 0.6 | 0.8 | 0.5 | 0.5 | 0.5 | 0.5 |
| Distance U1 (mm) | 3.8 | 3.8 | 3.8 | 3.8 | 3.8 | 3.8 | 3.8 | 3.8 | 3.8 | 3.8 |
| Distance U2 (mm) | 2.1 | 2.1 | 2.1 | 2.1 | 2.1 | 2.1 | 2.1 | 2.1 | 2.1 | 2.1 |

TABLE 2-continued

| Test Results | | | | | | | | | | |
|---|---|---|---|---|---|---|---|---|---|---|
| Air-in Performance | Good | Good | Good | Good | Good | Good | Good | Good | Good | Good |
| Amount of Lifting of Bead Toe (index) | 110 | 110 | 110 | 100 | 110 | 110 | 100 | 110 | 112 | 100 |
| Deformation of bead core | Good | Good | Good | Good | Good | Good | Good | Good | Good | Good |
| Durability of Bead (index) | 130 | 130 | 130 | 130 | 130 | 130 | 130 | 130 | 130 | 130 |
| Durability to Heat (index) | 115 | 115 | 115 | 115 | 115 | 115 | 115 | 115 | 115 | 115 |

*Ha = 7.0 mm, Wa = 2.0 mm

From Table 2, it is found that the tires of the Examples according to the present invention have an excellent air-in performance and an excellent durability of the bead portion.

What is claimed is:

1. A heavy duty tire comprising:
   a tread portion,
   a pair of sidewall portions,
   a pair of bead portions with a bead core therein,
   a carcass ply made of steel cords,
   the carcass ply extending between the bead portions through the tread portion and sidewall portions and turned up around the bead core in each said bead portion from the axially inside to the axially outside of the tire so as to form a main body portion and a pair of turnup portions, wherein each of the turnup portions is composed of a main portion and a sub-portion,
   the main portion bent along the axially inner surface, radially inner surface and axially outer surface of the bead core, and
   the sub-portion bent towards the carcass main body portion from the main portion to extend in the vicinity of the radially outer surface of the bead core,
   a core protecting rubber, at least a part of which is located in a core inside region, wherein the core inside region is defined as being located axially inward of the bead core in each said bead portion and being sandwiched between the axially inner surface of the bead core and the steel cords in the main portion of the carcass ply turnup portion,
   a filling rubber disposed in each said bead portion between the bead core and the carcass ply turnup portion,
   said core protecting rubber having a complex elastic modulus of 50 to 80 Mpa, and
   said filling rubber having a complex elastic modulus smaller than that of the core protecting rubber,
   wherein the core protecting rubber has a thickness gradually increasing in the direction from the radially inward toward the radially outward of the tire in the core inside region, and the width of the core protecting rubber at the position corresponding to 30% of the length of the core inside region in the tire radial direction from the radially outer end of the core inside region is from 20 to 80% of the width of the core inside region in the tire axial direction.

2. The heavy duty tire of claim 1, wherein the filling rubber has a complex elastic modulus of 5 to 50 MPa.

3. The heavy duty tire of claim 1, wherein the core protecting rubber comprises a diene rubber and a thermosetting resin.

4. A heavy duty tire comprising:
   a tread portion,
   a pair of sidewall portions,
   a pair of bead portions with a bead core therein,
   a carcass ply made of steel cords,
   the carcass ply extending between the bead portions through the tread portion and sidewall portions and turned up around the bead core in each said bead portion from the axially inside to the axially outside of the tire so as to form a main body portion and a pair of turnup portions, wherein each of the turnup portions is composed of a main portion and a sub-portion,
   the main portion bent along the axially inner surface, radially inner surface and axially outer surface of the bead core, and
   the sub-portion bent towards the carcass main body portion from the main portion to extend in the vicinity of the radially outer surface of the bead core,
   a core protecting rubber, at least a part of which is located in a core inside region, wherein the core inside region is defined as being located axially inward of the bead core in each said bead portion and being sandwiched between the axially inner surface of the bead core and the steel cords in the main portion of the carcass ply turnup portion,
   a filling rubber disposed in each said bead portion between the bead core and the carcass ply turnup portion,
   said core protecting rubber having a complex elastic modulus of 50 to 80 Mpa, and
   said filling rubber having a complex elastic modulus smaller than that of the core protecting rubber,
   wherein the core protecting rubber has a thickness gradually increasing in the direction from the radially inward toward the radially outward of the tire in the core inside region.

5. A heavy duty tire comprising:
   a tread portion,
   a pair of sidewall portions,
   a pair of bead portions with a bead core therein,
   a carcass ply made of steel cords,
   the carcass ply extending between the bead portions through the tread portion and sidewall portions and turned up around the bead core in each said bead portion from the axially inside to the axially outside of the tire so as to form a main body portion and a pair of turnup portions, wherein each of the turnup portions is composed of a main portion and a sub-portion,
   the main portion bent along the axially inner surface, radially inner surface and axially outer surface of the bead core, and
   the sub-portion bent towards the carcass main body portion from the main portion to extend in the vicinity of the radially outer surface of the bead core,
   a core protecting rubber, at least a part of which is located in a core inside region, wherein the core inside region is defined as being located axially inward of the bead core in each said bead portion and being sandwiched between the axially inner surface of the bead core and the steel cords in the main portion of the carcass ply turnup portion, a filling rubber disposed in each said bead portion between the bead core and the carcass ply turnup portion, said core protecting rubber having a complex elastic modulus of 50 to 80 Mpa, and said filling rubber having a complex elastic modulus smaller than that of the core protecting rubber, wherein a bead apex rubber having a complex elastic modulus of 20 to 70 MPa is disposed radially outward of the filling rubber so as to sandwich the sub-portion of the turnup portion of the carcass ply between the bead apex and the filling rubber.

* * * * *